United States Patent
Matsuo et al.

(10) Patent No.: US 12,523,767 B2
(45) Date of Patent: Jan. 13, 2026

(54) TARGET DETECTION DEVICE

(71) Applicant: HITACHI ASTEMO, LTD., Hitachinaka (JP)

(72) Inventors: Shunsuke Matsuo, Hitachinaka (JP); Kota Irie, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 177 days.

(21) Appl. No.: 18/552,253

(22) PCT Filed: Feb. 14, 2022

(86) PCT No.: PCT/JP2022/005723
§ 371 (c)(1),
(2) Date: Sep. 25, 2023

(87) PCT Pub. No.: WO2022/215348
PCT Pub. Date: Oct. 13, 2022

(65) Prior Publication Data
US 2024/0159895 A1 May 16, 2024

(30) Foreign Application Priority Data
Apr. 8, 2021 (JP) .................................. 2021-065863

(51) Int. Cl.
*G01S 13/931* (2020.01)
*G01S 13/58* (2006.01)
*G01S 13/86* (2006.01)

(52) U.S. Cl.
CPC .......... *G01S 13/931* (2013.01); *G01S 13/588* (2013.01); *G01S 13/867* (2013.01); *G01S 2013/932* (2020.01)

(58) Field of Classification Search
CPC .... G01S 13/931; G01S 13/588; G01S 13/867; G01S 2013/932

(Continued)

(56) References Cited

U.S. PATENT DOCUMENTS 11,017,513 B1 * 5/2021 Yarlagadda .......... G06V 10/765
2014/0343750 A1 11/2014 Minemura et al.
(Continued)

FOREIGN PATENT DOCUMENTS

| JP | 2014-021524 A | 2/2014 |
| JP | 2014-222462 A | 11/2014 |
| JP | 2018-205879 A | 12/2018 |

OTHER PUBLICATIONS

International Search Report with English Translation and Written Opinion of International Patent Application No. PCT/JP2022/005723 dated Apr. 26, 2022 (8 pages).

*Primary Examiner* — Isaac G Smith
(74) *Attorney, Agent, or Firm* — Foley & Lardner LLP

(57) ABSTRACT

Reliability of a target is appropriately determined. A target detection device detects a target around a vehicle based on sensor information measured by a plurality of sensors. The device includes: a first sensor; a second sensor; an integration processing unit that integrates detection information of the target of the first sensor and detection information of the target of the second sensor for each cycle; an integration history management unit that manages an integration result of the integration processing unit as an integration history in time series; and a reliability determination unit that determines reliability of a type of the target based on the integration history and the pieces of detection information of the target of the first sensor and the second sensor. The detection information of the target of the first sensor includes type information of the target.

6 Claims, 8 Drawing Sheets

(58) Field of Classification Search
USPC .......................................................... 701/300
See application file for complete search history.

(56) References Cited

U.S. PATENT DOCUMENTS

2018/0348360 A1* 12/2018 Wang ...................... G01S 7/354
2019/0353774 A1* 11/2019 Chondro ................. G01S 17/86

* cited by examiner (A)

(B)

| t=t1 | | |
|---|---|---|
| FUSION TARGET | ID=1 (PEDESTRIAN/ CONFIRMED) | ID=2 |
| FIRST SENSOR 10a (CAMERA) | ID=1 (PEDESTRIAN) | - |
| SECOND SENSOR 10b (RADAR) | ID=1 (UNIDENTIFIED) | - |

(C)

| t=t2 | | |
|---|---|---|
| FUSION TARGET | ID=1 (PEDESTRIAN/ PAST) | ID=2 |
| FIRST SENSOR 10a (CAMERA) | - | |
| SECOND SENSOR 10b (RADAR) | ID=1 (UNIDENTIFIED) | - |

(A)

(B)

| t=t1 | | |
|---|---|---|
| FUSION TARGET | ID=1 (PEDESTRIAN/ CONFIRMED) | ID=2 |
| FIRST SENSOR 10a (CAMERA) | ID=1 (PEDESTRIAN) | - |
| SECOND SENSOR 10b (RADAR) | ID=1 (UNIDENTIFIED) | - |

(C)

| t=t2 | | |
|---|---|---|
| FUSION TARGET | ID=1 (PEDESTRIAN/ PAST) | ID=2 |
| FIRST SENSOR 10a (CAMERA) | - | - |
| SECOND SENSOR 10b (RADAR) | ID=1 (UNIDENTIFIED) | - |

TARGET DETECTION DEVICE

TECHNICAL FIELD

The present invention relates to a target detection device.

BACKGROUND ART

Driving assistance systems and automated driving systems have been developed to achieve various purposes including reduction of traffic accidents, reduction of a burden on a driver, improvement of fuel efficiency for reducing global environmental burden, provision of transportation means to vulnerable road users for implementing a sustainable society, and the like. In the driving assistance systems and the automated driving systems, a plurality of sensors (cameras, radars, and the like) are provided in a vehicle in order to monitor the surroundings of the vehicle instead of the driver. In addition, a system that performs automatic braking for a specific target such as a pedestrian or a vehicle by using recognition results of a plurality of sensors mounted on a vehicle has been developed.

For example, PTL 1 discloses an object recognition device including a moving target discrimination unit that discriminates whether or not an object sensed by a radar device is a moving target, and an object extraction unit that extracts a specific object from an image captured by a camera unit. The specific object discrimination unit discriminates whether or not the object sensed by the radar device is a specific object based on a discrimination result of the moving target discrimination unit and an extraction result of the object extraction unit.

However, in the device of PTL 1, reliability of a type is determined by counting the number of times detection is performed by each or both of the sensors including the radar device and the camera unit for a target simultaneously detected by both sensors. Therefore, in a case where the object moves out of a camera sensing range after the simultaneous detection by both sensors, reliability of the target cannot be appropriately determined. In a case where the determination of the reliability of the target cannot be appropriately performed, there is a possibility that determination as to whether or not to perform automatic braking is not appropriately made.

CITATION LIST

Patent Literature

PTL 1: JP 2014-21524 A

SUMMARY OF INVENTION

Technical Problem

The present invention has been made in view of such problems, and provides a target detection device capable of appropriately determining reliability of a target.

Solution to Problem

A target detection device according to the present invention is a target detection device that detects a target around a vehicle based on sensor information measured by a plurality of sensors, the target detection device including: a first sensor; a second sensor; an integration processing unit that integrates detection information of the target of the first sensor and detection information of the target of the second sensor for each cycle; an integration history management unit that manages an integration result of the integration processing unit as an integration history in time series; and a reliability determination unit that determines reliability of a type of the target based on the integration history and the pieces of detection information of the target of the first sensor and the second sensor. The detection information of the target of the first sensor includes type information of the target.

Advantageous Effects of Invention

According to the present invention, it is possible to provide a target detection device capable of appropriately determining reliability of a target.

DESCRIPTION OF EMBODIMENTS

Hereinafter, the present embodiment will be described with reference to the accompanying drawings. In the accompanying drawings, functionally same elements may be denoted by the same numbers. Although the accompanying drawings illustrate embodiments conforming to the principles of the present disclosure, they are for understanding the present disclosure and are not used to interpret the present disclosure in a limited manner. The description herein is exemplary only and is not intended to limit the claims or applications of the present disclosure in any way.

In the present embodiment, a description is made in sufficient detail for those skilled in the art to implement the present disclosure, but it is necessary to understand that other implementations and embodiments are possible, and changes in configurations and structures and replacement of various elements are possible without departing from the scope and spirit of the technical idea of the present disclosure. Therefore, the following description should not be interpreted as being limited thereto.

First Embodiment

Figure 1:
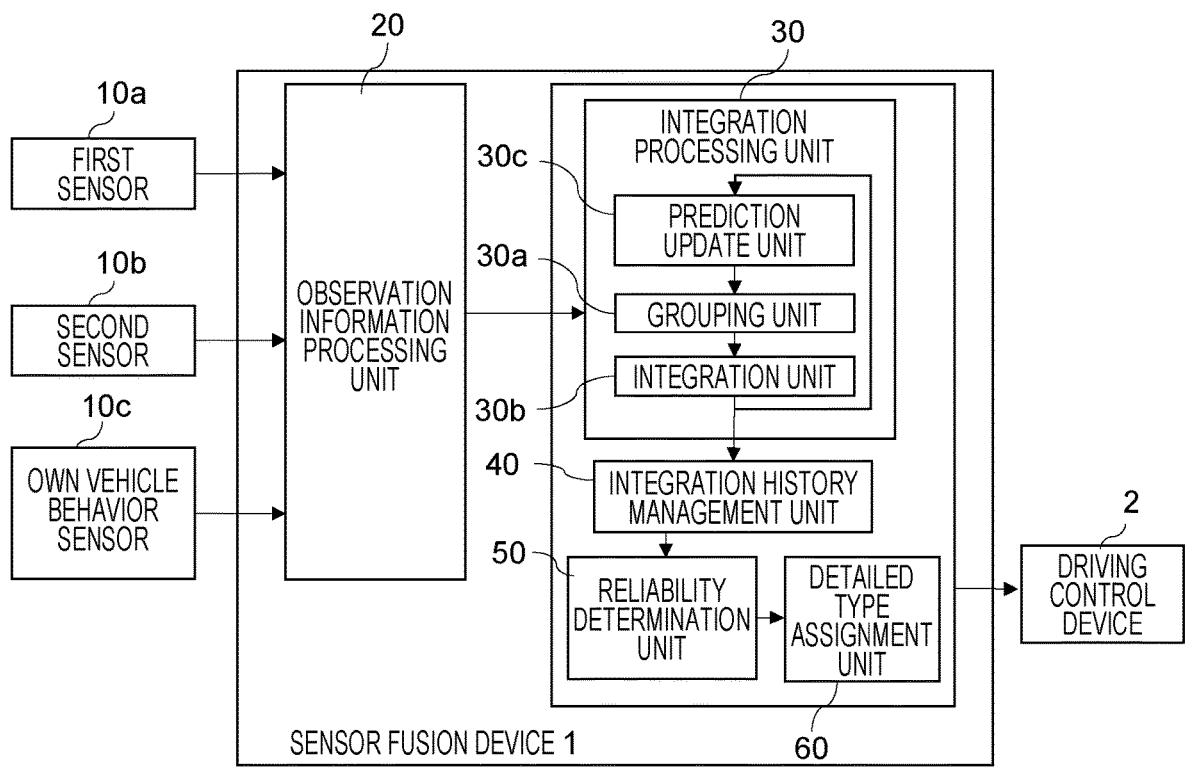
FIG. 1 is a functional block diagram of a target detection device (sensor fusion device 1) according to a first embodiment.

FIG. 1 is a functional block diagram of a target detection device (sensor fusion device 1) according to a first embodiment. As illustrated in FIG. 1, the sensor fusion device 1 of the first embodiment includes an observation information processing unit 20, an integration processing unit 30, an integration history management unit 40, a reliability determination unit 50, and a detailed type assignment unit 60. Further, output signals of a first sensor 10a, a second sensor 10b, and an own vehicle behavior sensor 10c are input to the sensor fusion device 1.

The first sensor 10a and the second sensor 10b are sensors that senses a target around an own vehicle. As an example, the first sensor 10a is a sensor capable of determining a type of the target based on captured image data of the target or the like, and is, for example, a camera (a visible light camera, a near-infrared camera, a mid-infrared camera, or a far-infrared camera). The second sensor 10b is a sensor that can determine the presence and position of the target and does not have a function of determining the type of the target, and can be, for example, a millimeter-wave radar, a light detection and ranging (LiDAR), a sonar, a time of flight (TOF) sensor, or a combination thereof. The own vehicle behavior sensor 10c is a sensor group that senses a speed, a steering angle, a yaw rate, and the like of the own vehicle. As an example, the own vehicle behavior sensor 10c includes a wheel speed sensor, a steering angle sensor, an acceleration sensor, a gyro sensor, and the like.

Detection information of the first sensor 10a includes at least a position, a speed, a type, and a target ID of the detected target, and detection information of the second sensor 10b includes at least the position, the speed, and the target ID of the detected target. The sensor fusion device 1 (electronic control device) and the various sensors (the first sensor 10a, the second sensor 10b, and the like) of the present embodiment internally include a computer (microcomputer) including an arithmetic device, a memory, and an input/output device.

The arithmetic device includes a processor and executes a program stored in the memory. A part of processing executed by the arithmetic device executing the program may be executed by another arithmetic device (for example, hardware such as a field programmable gate array (FPGA) or an application specific integrated circuit (ASIC)).

The memory includes a read only memory (ROM) and a random access memory (RAM) which are non-volatile storage elements. The ROM stores an invariable program (for example, BIOS). The RAM is a high-speed and volatile storage element such as a dynamic random access memory (DRAM) and a non-volatile storage element such as a static random access memory (SRAM), and stores the program executed by the arithmetic device and data used when the program is executed.

The input/output device is an interface that transmits a content of processing executed by the electronic control device or the sensor to the outside and receives data from the outside according to a predetermined protocol. The program executed by the arithmetic device is stored in a non-volatile memory which is a non-transitory storage medium of the electronic control device or the sensor.

The observation information processing unit 20 has a function of receiving the detection information of the first sensor 10a and the detection information of the second sensor 10b and receiving the speed, the steering angle, the yaw rate, and the like of the own vehicle output from the own vehicle behavior sensor 10c, and performing uniform conversion into a predetermined format. A sign given as the target ID is the same when the same target is being tracked in a time direction. In addition, at least time and coordinate information are included in the above-described format, the time indicates, for example, a fusion execution timing, and the coordinates indicate, for example, a coordinate system in which the center of the own vehicle is an origin, a front side of the own vehicle is an x axis, and a left side of the own vehicle is a y axis.

The integration processing unit 30 receives the detection information of the target output from the observation information processing unit 20 and executes integration processing to be described below. The integration processing unit 30 includes a grouping unit 30a that groups a plurality of pieces of detection information, an integration unit 30b that integrates the grouped pieces of detection information of the target to generate or update a fusion target, and a prediction update unit 30c that performs prediction update for integrating the pieces of detection information and tracking the same target in time series.

The grouping unit 30a determines whether or not the plurality of pieces of detection information are the detection information of the same target by using at least position information in the detection information of the target, and groups the plurality of pieces of detection information determined to be of the same target as one set of information. The plurality of pieces of detection information grouped by the grouping unit 30a are integrated and converted into the fusion target by the integration unit 30b, and the same target ID is assigned. The grouping in the grouping unit 30a and the integration processing in the integration unit 30b are performed for each predetermined cycle.

In a case where estimation information of the fusion target of the previous cycle is obtained by the prediction update unit 30c, the grouping unit 30a performs identity determination between the estimation information of the fusion target obtained in the previous cycle and the plurality of pieces of detection information obtained in the current cycle, in preference to identity determination between the plurality of pieces of detection information for grouping. The identity determination for the estimation information of the fusion target obtained in the previous cycle is performed using at least position information in the estimation information of the fusion target obtained in the previous cycle and position information included in the plurality of pieces of detection information obtained in the current cycle. In a case where it is determined that the estimation information of the fusion target obtained in the previous cycle is identical to the detection information obtained in the current cycle, the target IDs assigned to the plurality of pieces of detection information are the same as the target IDs of the fusion target of the previous cycle determined to be identical.

The plurality of pieces of detection information grouped by the grouping unit 30a are output to the integration unit 30b. The integration unit 30b integrates the plurality of grouped pieces of detection information to generate or update the fusion target. In the integration processing, for example, error characteristics of sensing by the first sensor 10a and the second sensor 10b are provided to the integration unit 30b in advance as parameters, and the integration can be performed based on a position and speed corrected according to the parameters of the error characteristics. Alternatively, the error characteristic may be defined by a covariance matrix, and the integration may be performed by adopting the position/speed calculated by probabilistic averaging.

In addition, the error characteristic of each sensor may be estimated during the integration processing in the integration unit 30*b* instead of being provided to the integration unit 30*b* in advance. The detection information of the first sensor 10*a* and the detection information of the second sensor 10*b* may include data of such an error characteristic. In addition, even in a case where the number of pieces of detection information of the sensor included in the fusion target is one, the integration unit 30*b* outputs the detection result as the fusion target. In the following description, even in a case where one piece of detection information of the sensor is grouped, the expression "being integrated" as the fusion target is used. The information regarding the position and speed in the fusion target may be the same as the detection information of the sensor, or may indicate the position and speed internally estimated in time series according to the detection information of the sensor.

Information of the fusion target that is a result of the detection information integration processing in the integration unit 30*b* is output to the prediction update unit 30*c*. In addition, the fusion target, and the detection information of the first sensor 10*a* and the detection information of the second sensor 10*b* included in the fusion target are output to the integration history management unit 40. The integration history management unit 40 has a function of managing the information of the generated or updated fusion target in time series.

The prediction update unit 30*c* calculates an estimated value of the fusion target in the next integration processing cycle by using an execution cycle of the integration processing, the information regarding the position and speed included in the detection information of the fusion target, and the speed, the steering angle, the yaw rate, and the like of the own vehicle output from the own vehicle behavior sensor 10*c*. For example, the prediction update unit 30*c* can obtain the estimation information of the fusion target by calculating a temporal change of the position of the target using at least the speed of the fusion target and the execution cycle of the integration processing and estimating the position of the fusion target based on the calculated temporal change of the position. The position and speed of the target may be estimated in consideration of a turning behavior of the own vehicle by using the speed, the steering angle, the yaw rate, and the like of the own vehicle. The estimation information of the fusion target obtained by the prediction update unit 30*c* is output to the grouping unit 30*a* as described above.

The integration history management unit 40 receives the fusion target output from the integration processing unit 30, and the detection information of the first sensor 10*a* and the detection information of the second sensor 10*b* included in the fusion target, and stores and manages the fusion target in time series for each target ID. The information managed by the integration history management unit 40 is output to the reliability determination unit 50 and the detailed type assignment unit 60.

The reliability determination unit 50 receives an integration history of the fusion target from the integration history management unit 40, determines reliability of the fusion target based on the integration history, and assigns, to the fusion target, information regarding the reliability that is the determination result. In addition, the detailed type assignment unit 60 assigns the type of the target indicated by the fusion target and the information regarding the reliability thereof to the fusion target as detailed type information. The information generated by the detailed type assignment unit 60 is output to a driving control device 2, and automobile control including automated driving, driving assistance, or the like is performed.

The reliability determination unit 50 of the first embodiment determines the reliability of the fusion target regarding the type of the target such as a pedestrian or a vehicle from a combination of the fusion target of the previous cycle obtained from the integration history management unit 40 and the fusion target of the current cycle. Specifically, the reliability determination unit 50 determines the reliability of a specific type (a pedestrian, a car, a bicycle, or the like) indicated by each fusion target according to a content of the detection information in the fusion target obtained in the previous cycle and a content of the detection information of the target in the fusion target of the current cycle. In the present embodiment, as an example, the reliability is classified into at least three of "confirmed", "past", and "split" in descending order of the reliability. One of basic determination criteria of the reliability determination is to determine that the reliability is high in a case where grouping is performed based on the detection information of the first sensor 10*a*. Another criterion is that grouping of the current cycle is more reliable than grouping of the previous cycle.

"Confirmed" corresponding to the highest reliability among the determination results for the specific type is determined in a case where the detection information of the first sensor 10*a* is integrated as the fusion target in the current cycle. The reason why "confirmed" corresponds to the highest reliability of the type is that the detection information of the first sensor 10*a* having high reliability is obtained in the current cycle, and a combination including the detection information of the first sensor 10*a* obtained in the current cycle has the highest reliability as a possible combination of integration.

"Past" corresponding to the second highest reliability after "confirmed" is assigned in a case where the detection information of the first sensor 10*a* is not grouped in the current cycle, but the detection information of the first sensor 10*a* is grouped in the previous cycle.

The reason why the reliability of "past" is the second highest after "confirmed" is that, while consistency of grouping between the previous cycle and the current cycle is maintained, the detection information of the first sensor 10*a* is not grouped in the current cycle unlike "confirmed". For example, in a case where the detection information of the first sensor 10*a* grouped in the previous cycle does not exist in the current cycle and the detection information of the first sensor 10*a* is not grouped, it means that the first sensor 10*a* no longer senses the target due to movement of the target out of a sensing range (detection range) of the first sensor 10*a* or the like, and the detection information is no longer input to the sensor fusion device 1. That is, in a case where the detection information of the first sensor 10*a* grouped in the previous cycle does not exist in the current cycle, it is inevitable that the detection information is not grouped in the current cycle. Therefore, it can be said that the consistency of grouping is maintained in a plurality of cycles. Therefore, "past" is determined to correspond to the second highest reliability after "confirmed".

Among the three categories of reliability, "split" corresponds to the lowest reliability. Specifically, for one fusion target, in a case where the detection information of the first sensor 10*a* is not grouped in the current cycle, the detection information of the first sensor 10*a* is grouped in the previous cycle, and another detection information of the first sensor 10*a* exists in the current cycle, the reliability is determined to be "split". The reason why "split" corresponds to lower reliability than "past" is that the consistency of grouping is not maintained in a plurality of cycles, unlike "past".

In a case where the detection information of the first sensor grouped as a certain fusion target in the previous cycle exists as the detection information of the first sensor of another fusion target in the current cycle, it is correct that the detection information is not integrated as the certain fusion target based on a policy that grouping in the current period is more correct. That is, grouping the detection information of the first sensor in the previous cycle is actually erroneous, and the consistency of grouping is not maintained in a plurality of cycles. Therefore, it is determined that the reliability of "split" is lower than "past".

Next, a procedure for reliability determination and detailed type information assignment in the reliability determination unit 50 and the detailed type assignment unit 60 will be described with reference to the flowchart of FIG. 2. The procedure for this flowchart is executed for each target ID in each cycle of the integration processing.

The integration history management unit 40 receives a result of grouping and integration of the detection information from the integration processing unit 30 for each cycle, and manages a history of the integration for each cycle. The reliability determination unit 50 determines the reliability of the specific type in the fusion target obtained for each cycle. The detailed type assignment unit 60 assigns a detailed type that is the reliability determination result to the fusion target.

First, the reliability determination unit 50 receives the detection information obtained in the current cycle, and determines whether or not the integration processing unit 30 has grouped the detection information as the fusion target related to the target ID in the current cycle and assigned with the specific type information (step S100). In a case where the determination result is affirmative (YES), the processing proceeds to step S130, and "confirmed" is assigned as the reliability information to the grouped fusion target assigned with the specific type information. On the other hand, in a case where the determination in step S100 is negative (NO), the processing proceeds to step S110.

In step S110, the reliability determination unit 50 receives the detection information obtained in the previous cycle from the integration history management unit 40, and determines whether or not the detection information has been grouped as the corresponding fusion target and assigned with the specific type information in the previous cycle (step S110). If YES, the processing proceeds to step S120. If NO, the reliability is not determined, and the processing ends (END).

In a case where the determination result of step S110 is YES, in step S120, it is determined whether or not another detection information grouped in the previous cycle and related to the assigned specific type exists (as a fusion target with another target ID) in the current cycle. In a case where the determination result in step S120 is YES, it is determined in step S140 that the reliability of the specific type of the fusion target is "split", and the detailed type information indicating that the reliability is "split" is assigned. On the other hand, in a case where the determination result in step S130 is NO, it is determined in step S150 that the reliability of the specific type of the fusion target is "past", and the detailed type information indicating that the reliability is "past" is assigned. In this way, the procedure for the reliability determination and the detailed type information assignment ends.

Figure 2:
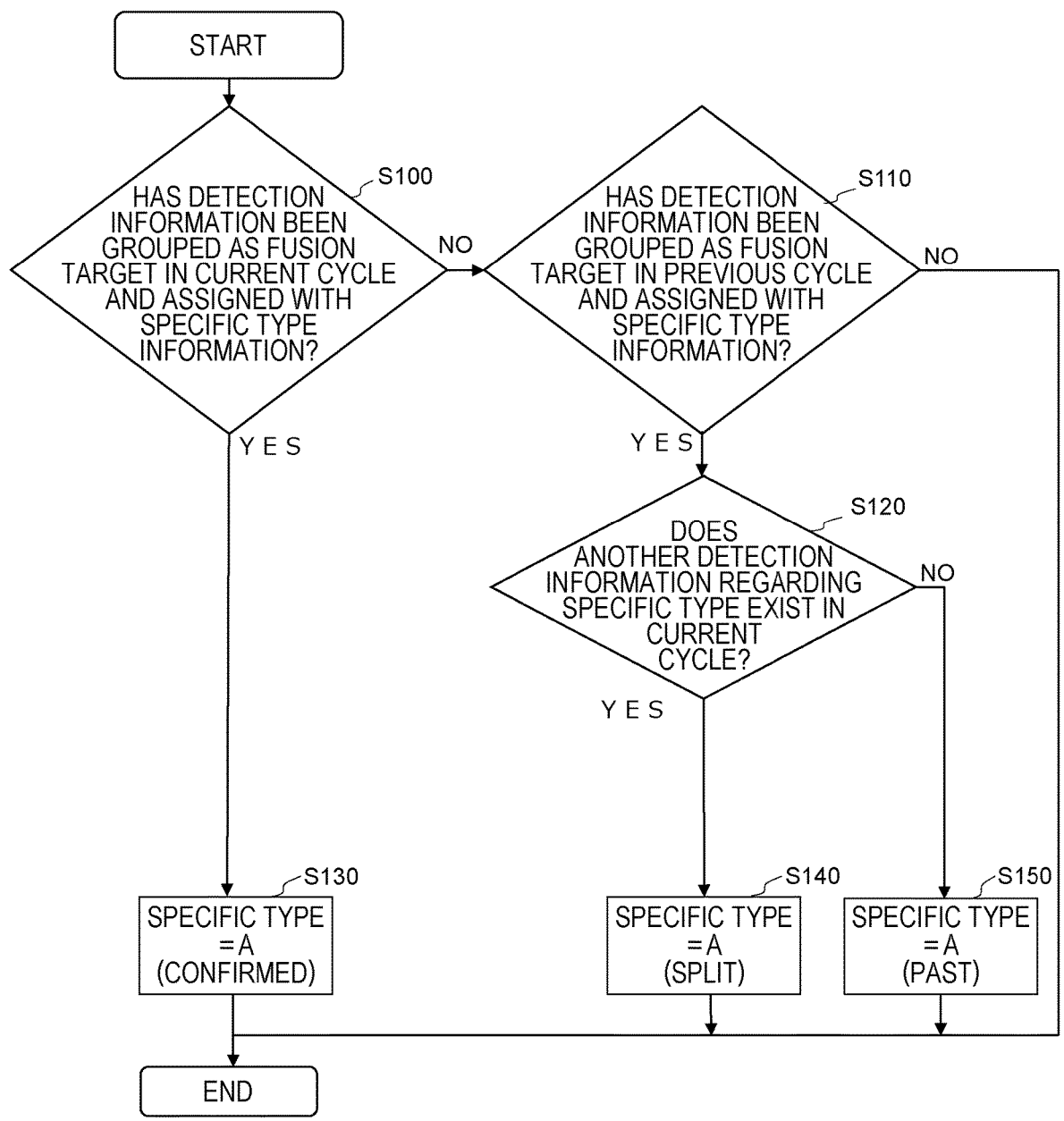
FIG. 2 is a flowchart for describing a procedure for reliability determination and detailed type information assignment in a reliability determination unit 50 and a detailed type assignment unit 60.

Next, how the determination procedure of FIG. 2 is executed will be described assuming various scenarios with reference to FIGS. 3 to 6.

Figure 3:
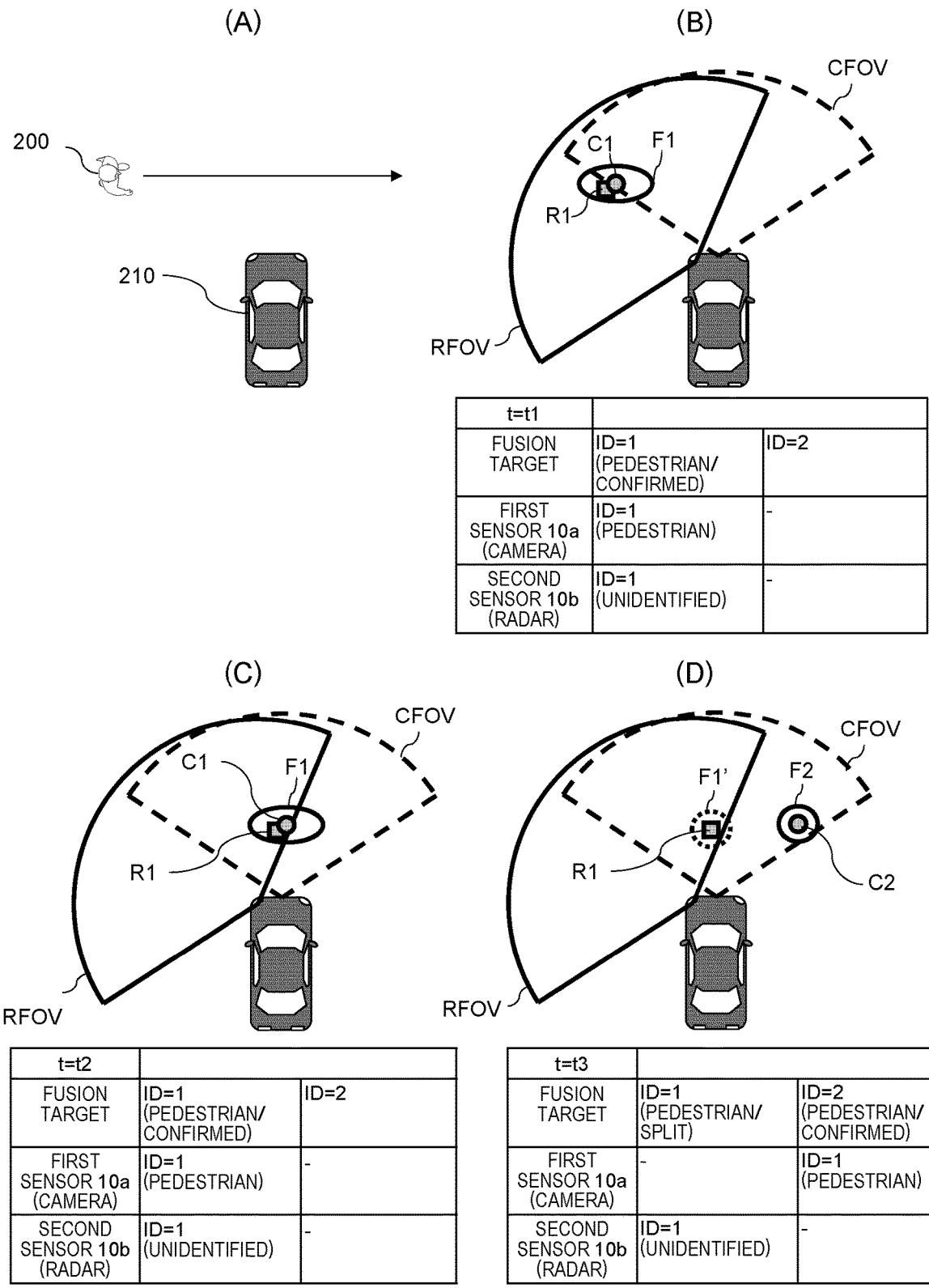
FIG. 3 is a schematic diagram for describing the reliability determination and detailed type information assignment according to one scenario.

FIG. 3 is a schematic diagram illustrating a procedure for determining the reliability and the detailed type when a pedestrian 200 crosses in front of an own vehicle 210. Hereinafter, in FIG. 3, a description will be made assuming that time advances in the order of (B), (C), and (D).

In FIG. 3, a sensing range CFOV of the first sensor (camera) 10*a* is indicated by a broken sector, and a sensing range RFOV of the second sensor (radar) 10*b* is indicated by a solid sector. Pieces of detection information C1 and C2 of the first sensor 10*a* are indicated by circles, and detection information R1 of the second sensor 10*b* is indicated by a rectangle. In addition, a fusion target F1 which is generated by integrating a plurality of pieces of detection information and to which the detailed type information of "confirmed" is assigned for a predetermined specific type is indicated by a solid ellipse. In addition, a fusion target F2 determined as "split" is indicated by a dotted ellipse.

In addition, tables in FIGS. 3(B) to 3(D) show sensing results of the first sensor 10*a* and the second sensor 10*b* and an integration result of the integration unit 30*b* at each moment (t=t1, t2, and t3). However, FIGS. 3(B) to 3(D) illustrate partial integration results in order to facilitate the description of the reliability determination, and do not necessarily illustrate continuous cycles.

As illustrated in FIG. 3(A), when the pedestrian 200 crosses in front of the own vehicle 210, in the situation of (B), the pedestrian 200 is present in an overlapping portion of the sensing range CFOV of the first sensor 10*a* and the sensing range RFOV of the second sensor 10*b*, and is simultaneously sensed by both the sensors 10*a* and 10*b*. In the first sensor 10*a*, the pedestrian 200 is sensed as a pedestrian target C1 with the target ID=1, and in the second sensor 10*b*, the pedestrian 200 is sensed as an unidentified target R1 with the target ID=1. The grouping unit 30*a* groups the detection information of the pedestrian target C1 with the target ID=1 from the first sensor 10*a* and the detection information of the unidentified target R1 with the target ID=1 from the second sensor 10*b* by assigning the target ID of 1 (target ID=1) based on matching of the position information of the detection information. The integration unit 30*b* integrates the grouped detection information to generate the fusion target F1.

The integration history management unit 40 holds the fusion target F1 assigned with the target ID=1 as a result of integration of the current cycle (t=t1). As an operation in step S100 of FIG. 2, the reliability determination unit 50 determines whether or not the detection information has been grouped as the fusion target F1 and assigned with the specific type information in the current cycle. In the situation of (B), affirmative determination (YES) is made in step S100, and the detailed type information indicating that the specific type=pedestrian and the reliability="confirmed" is assigned to the fusion target F1.

After FIG. 3(B), when the pedestrian 200 further proceeds to the right and the integration processing unit 30 shifts to the next cycle (t=t2), the situation shifts to the situation as in FIG. 3(C). In FIG. 3(C), the pedestrian 200 is still within the sensing range CFOV of the first sensor 10*a* and within the sensing range RFOV of the second sensor 10*b*. Therefore, the detection information of the first sensor 10*a* and the detection information of the second sensor 10*b* are grouped based on matching of the position information, and are integrated as the fusion target F1 with the target ID=1. Affirmative determination (YES) is made in step S100, it is determined that the specific type=pedestrian and the reliability="confirmed", and the detailed type information is assigned to the fusion target F1.

After FIG. 3(C), when the pedestrian 200 further crosses the own vehicle 210 to the right and the integration processing unit 30 further shifts to the next cycle (t=t3), the situation shifts to the situation as in FIG. 3(D). In FIG. 3(D), the pedestrian 200 is still within the sensing range CFOV of the first sensor 10a, and has moved out of the sensing range RFOV of the second sensor 10b.

Although the pedestrian 200 has already moved out of the sensing range RFOV of the second sensor 10b, the second sensor 10b senses the pedestrian 200 as the unidentified target R1 with the target ID=1 by an internal interpolation function of the second sensor 10b. The internal interpolation means that the sensor behaves as if the target is continuously sensed by interpolating the target moving outside the sensing range with a sensing end in order to prevent non-sensing of a control target.

Meanwhile, since the pedestrian 200 is within the sensing range CFOV of the first sensor 10a, the first sensor 10a senses the pedestrian 200 and determines that the specific type=pedestrian. However, since the position information of the detection information of the second sensor 10b does not match the position information of the detection information of the first sensor 10a, the detection information of the first sensor 10a is not grouped for the same target ID as the detection information of the second sensor 10b. Since the detection information of the first sensor 10a with the target ID=1 is not grouped, the detection information of the first sensor 10a is grouped as a fusion target F2 with another target ID=2, and it is recognized that the specific type=pedestrian and the reliability="confirmed". Therefore, in the situation of FIG. 3(D), negative determination (NO) is made for a fusion target F1' with the target ID=1 in step S100, and the processing proceeds to step S110. On the other hand, affirmative determination (YES) is made for the fusion target F2 with the target ID=2, and the detailed type information indicating that the specific type=pedestrian and the reliability="confirmed" is assigned.

For the fusion target F1' with the target ID=1, in subsequent step S110, it is determined whether or not the detection information has been grouped as the fusion target F1 with the target ID=1 and assigned with the specific type information in the previous cycle. In FIG. 3(D), since the specific type information indicating that the specific type=pedestrian is assigned to the fusion target F1 with the target ID=1 in FIG. 3(C) (t=t2), affirmative determination (YES) is made in step S110, and the processing proceeds to step S120. Then, in step S120, since another fusion target F2 determined as the specific type=pedestrian exists, affirmative determination (YES) is made, and the detailed type information indicating that the specific type=pedestrian and the reliability="split" is assigned to the fusion target F1' with the target ID=1. As described above, in FIG. 3, it is determined that the reliability is "split".

Figure 4:
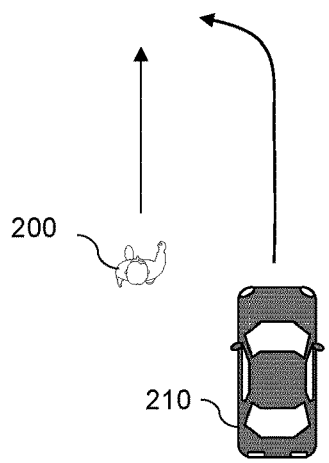
FIG. 4 is a schematic diagram for describing the reliability determination and detailed type information assignment according to one scenario.
Figure 4:
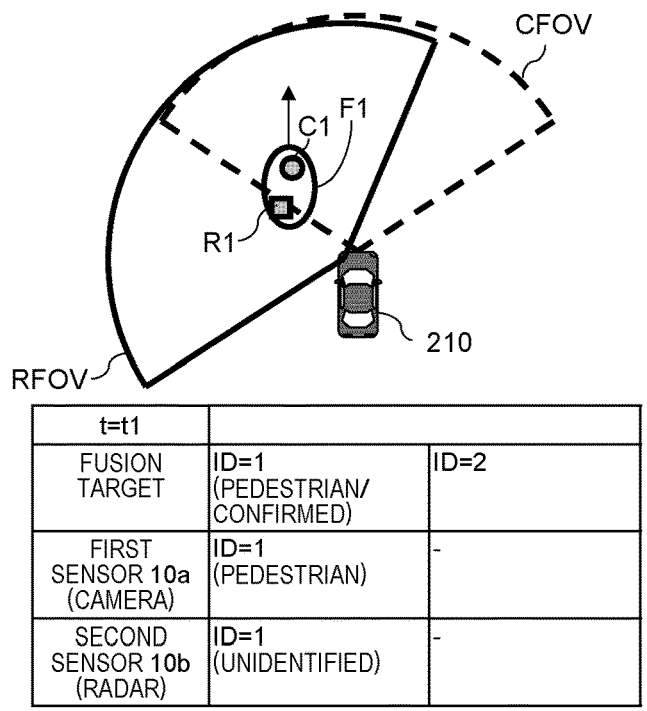
Figure 4:
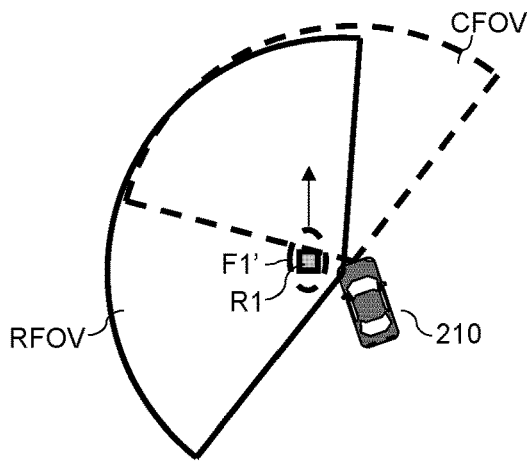

Next, still another case will be described with reference to FIG. 4. FIG. 4(A) illustrates a case where the own vehicle 210 turning to the left (left turn) approaches the pedestrian 200 walking in parallel on the left side. FIG. 4(B) illustrates a situation before the own vehicle 210 starts turning left, and the pedestrian 200 exists in an overlapping portion of the sensing range CFOV of the first sensor 10a and the sensing range RFOV of the second sensor 10b. The pieces of detection information of both the sensors 10a and 10b indicate the same position information. The pedestrian 200 is recognized as the target C1 with the target ID=1 and the specific type=pedestrian based on the detection information of the first sensor 10a, and is recognized as the target R1 with the target ID=1 and the specific type=unidentified based on the detection information of the second sensor 10b. Therefore, the detection information of the first sensor 10a and the detection information of the second sensor 10b are grouped for the same target ID=1 based on the matching of the position information, and are integrated to generate the fusion target F1.

The integration history management unit 40 stores and manages the fusion target F1 with the target ID=1 as data of the integration history of the current cycle. In addition, the reliability determination unit 50 assigns the detailed type information indicating that the specific type=pedestrian and the reliability="confirmed" to the fusion target F1 according to the affirmative determination (YES) made in step S100.

Next, as illustrated in FIG. 4(C), in a stage where the integration processing unit 30 shifts to the next cycle (t=t2), the own vehicle 210 starts turning left, and the pedestrian 200 approaches a left side portion of the own vehicle 210. Here, the pedestrian 200 is present within the sensing range RFOV of the second sensor 10b and is in a blind spot from the sensing range CFOV of the first sensor 10a, and thus, the pedestrian 200 is not present within the sensing range CFOV. Therefore, in the cycle of t=t2, only the detection information of the second sensor 10b is obtained, and the detection information is integrated as the target R1 with the specific type=unidentified in the fusion target F1' with the target ID=1.

The reliability determination unit 50 performs the determination in step S100 for the fusion target F1' with the target ID=1 and makes negative determination (NO). Next, in step 110, it is determined whether or not the detection information has been grouped as the fusion target F1 and assigned with the specific type information in the previous cycle. In this example, affirmative determination (YES) is made, and the processing proceeds to step S120. Subsequently, in step S120, it is determined whether or not another detection information grouped as the fusion target F1 in the previous cycle and related to the determined specific type exists in the current cycle (step S120). Here, as described in FIG. 4(C), since it is determined that the type is unidentified for the fusion target F1', negative determination (NO) is made. As described above, in FIG. 4, the reliability of the fusion target F1' with the target ID=1 is determined as "past".

Figure 5:
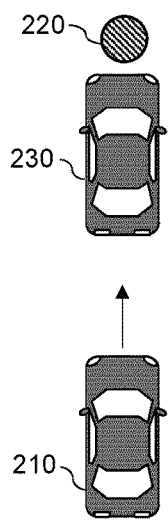
FIG. 5 is a schematic diagram for describing the reliability determination and detailed type information assignment according to one scenario.
Figure 5:
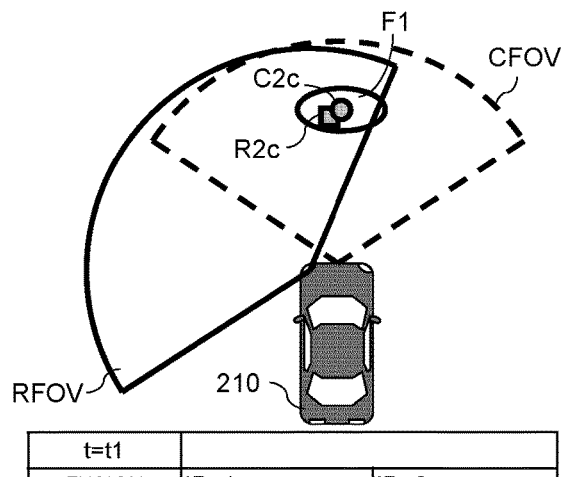
Figure 5:
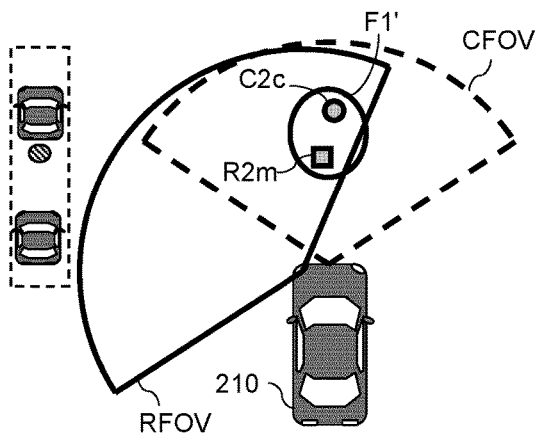
Figure 5:
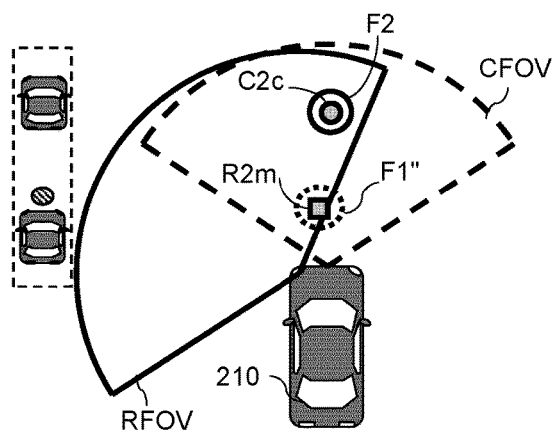

FIG. 5 illustrates a determination procedure in a case where another preceding vehicle 230 is traveling in front of the own vehicle 210 and the preceding vehicle 230 passes through a manhole 220 on a road surface on the way. As illustrated in FIG. 5(A), when the another preceding vehicle 230 is traveling in front of the own vehicle 210 at substantially the same speed, and there is a manhole 220 in front of the own vehicle, the first sensor 10a is blocked by the another preceding vehicle 230 and thus does not sense the manhole 220. Similarly, the second sensor 10b does not sense the manhole 220 and senses only the another preceding vehicle 230 as a target.

In this case, the detection information of the first sensor 10a and the detection information of the second sensor 10b have substantially the same position information. The first sensor 10a senses the preceding vehicle 230 as a vehicle target C2c with the target ID=1, and the second sensor 10b senses the preceding vehicle 230 as an unidentified target R1c with the target ID=1. The grouping unit 30a groups the detection information of the vehicle target C2c with the target ID=1 from the first sensor 10a and the detection information of the unidentified target R2c with the target ID=1 from the second sensor 10b by assigning the target ID of 1 (target ID=1) based on matching of the position information of the detection information. The integration unit 30b integrates the grouped detection information to generate the fusion target F1.

The integration history management unit 40 holds the fusion target F1 assigned with the target ID=1 as a result of integration of the current cycle (t=t1). As an operation in step S100 of FIG. 2, the reliability determination unit 50 determines whether or not the detection information has been grouped as the fusion target F1 and assigned with the specific type information in the current cycle. In the situation of (B), the determination result in step S100 is YES, and the detailed type information indicating that the specific type=vehicle and the reliability="confirmed" is assigned to the fusion target F1.

After FIG. 5(B), when the preceding vehicle 230 further travels on the road surface and passes through the manhole 220, and the integration processing unit 30 shifts to the next cycle (t=t2), the situation shifts to the situation as in FIG. 5(C). Here, FIG. 5(C) illustrates a state immediately after the preceding vehicle 230 passes through the manhole 220. In this case, the preceding vehicle 230 is sensed by the first sensor 10a and sensed as a target with the target ID=1 and the specific type=vehicle, whereas the manhole 220 is sensed by the second sensor 10b and sensed as a target with the target ID=1 and the specific type=unidentified. In this case, the detection information (target C2c) of the first sensor 10a and the detection information (target R2m) of the second sensor 10b should not be grouped and integrated, but since the pieces of position information thereof substantially match each other, the detection information of the first sensor 10a and the detection information of the second sensor 10b can be erroneously integrated as the fusion target F1' with the target ID=1.

Next, FIG. 5(D) illustrates a case where the preceding vehicle 230 further continues traveling and travels to the front side away from the manhole 220. The integration processing unit 30 further shifts to the next cycle (t=t3). In this case, even in a case where the first sensor 10a senses the preceding vehicle 230 and the detection information indicating that the specific type=vehicle is obtained, and the second sensor 10b senses the manhole 220 and the detection information indicating that the specific type=unidentified is obtained, both pieces of detection information are integrated as different fusion targets (F2 (ID=2) and F1" (ID=1)), respectively, because the position information is different.

Since the determination result indicating that the specific type=vehicle has been obtained for the fusion target F2, affirmative determination (YES) is made in step S100, and the detailed type information indicating that the specific type=vehicle and the reliability="confirmed" is assigned to the fusion target F2. On the other hand, since the determination result indicating that the specific type=unidentified has been obtained for the fusion target F1", negative determination (NO) is made in step S100, affirmative determination (YES) is made in subsequent step S110, affirmative determination (YES) is made in step S120, and the detailed type information indicating that the specific type=vehicle and the reliability="split" is assigned.

As described above, in FIG. 5, at a time point of (C), the detection information for the preceding vehicle 230 obtained by the first sensor 10a and the detection information for the manhole 220 obtained by the second sensor 10b are erroneously integrated, and the detailed type information indicating that the specific type=vehicle and the reliability="confirmed" is erroneously assigned, but at the next time point of (D), the reliability is corrected to "split". As described above, according to the determination procedure of FIG. 2, even if the erroneous reliability determination is once made in one cycle, the reliability is corrected in the next cycle, and the accuracy of the reliability determination can be secured.

Figure 6:
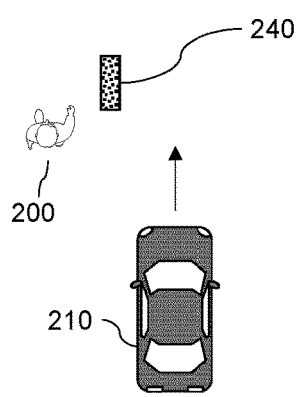
FIG. 6 is a schematic diagram for describing the reliability determination and detailed type information assignment according to one scenario.
Figure 6:
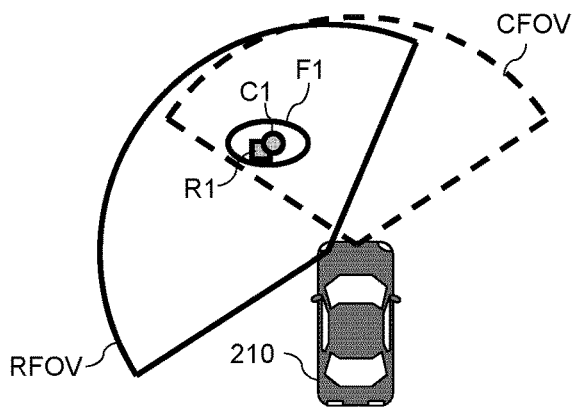
Figure 6:
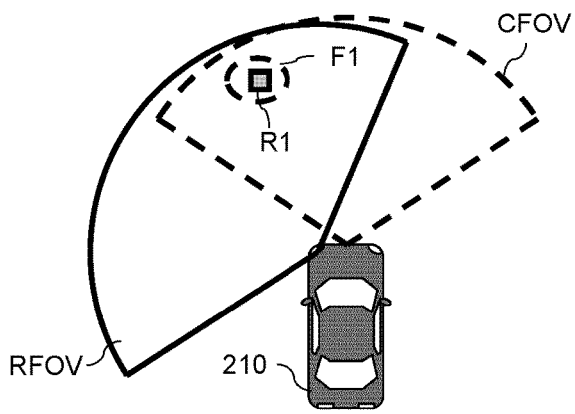

Still another case will be described with reference to FIG. 6. FIG. 6 illustrates a case where the pedestrian 200 is walking in parallel in front of the own vehicle 210, and there is an obstacle 240 (a wall or the like) on the way, and the pedestrian 200 is blocked by the obstacle 240 at a certain time point and cannot be seen from the own vehicle 210.

In a situation where the own vehicle 210 is traveling forward, and the pedestrian 200 is still positioned on a left-front side of the own vehicle 210 and is not blocked by the obstacle 240 as illustrated in FIG. 6(A), various types of detection information as illustrated in FIG. 6(B) are obtained. The pedestrian 200 is detected by the first sensor 10a and recognized as a target with the target ID=1 and the specific type=pedestrian, and the pedestrian 200 is recognized by the second sensor 10b as a target with the target ID=1 and the specific type=unidentified. The detection information (target C1) of the first sensor 10a and the detection information (target R2) of the second sensor 10b are integrated as the fusion target F1 (target ID=1) in the integration processing unit 30 based on matching of the position information.

Subsequently, when the own vehicle 210 and the pedestrian 200 both move forward and the obstacle 240 blocks between the first sensor 10a and the pedestrian 200, for example, a situation as illustrated in FIG. 6(C) occurs. The first sensor 10a cannot capture an image of the pedestrian 200 and cannot obtain the detection information of the first sensor 10a. On the other hand, the detection information of the second sensor 10b is continuously obtained based on the above-described internal interpolation function or the like, and the pedestrian 200 is detected as the target R1 and integrated as the fusion target F1. In the situation of FIG. 6(C), negative determination (NO) is made in step S100, affirmative determination (YES) is made in step S110, and negative determination (NO) is made in step S120, and it is determined that the specific type=pedestrian and the reliability="past".

As described above with reference to various specific examples such as FIGS. 3 to 6, with the sensor fusion device 1 of the first embodiment, the determination of the specific type of the fusion target can be performed with high reliability, and it is possible to improve the accuracy of automated driving and driving assistance. Specifically, the integration history management unit 40 manages the integration result obtained by integrating the pieces of detection information of the sensors obtained in each cycle, and compares the integration result obtained in the previous cycle with the integration result obtained in the current cycle, so that it is possible to perform the determination of the specific type with high reliability.

Second Embodiment

Figure 7:
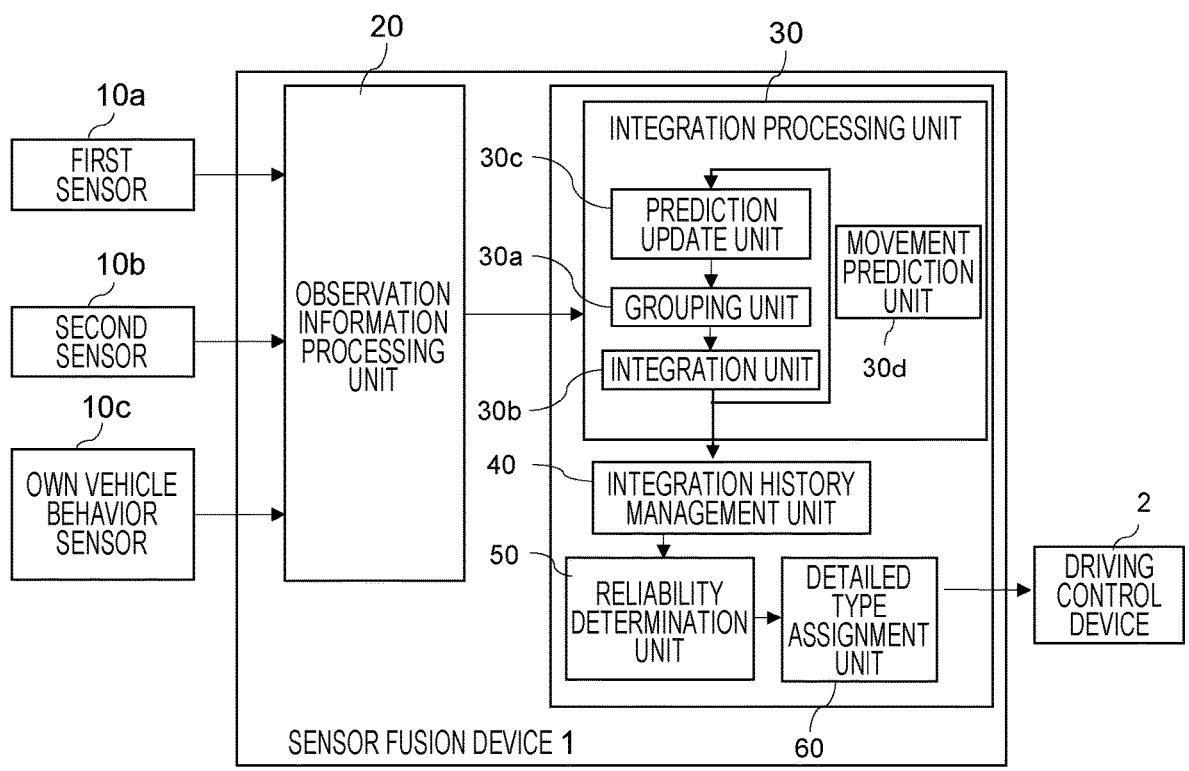
FIG. 7 is a functional block diagram of a target detection device (sensor fusion device 1) according to a second embodiment.
Figure 8:
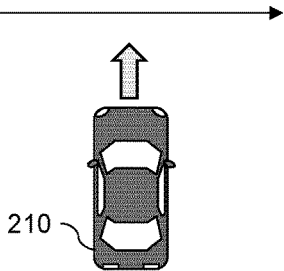
FIG. 8 is a schematic diagram for describing reliability determination and detailed type information assignment in the second embodiment according to one scenario.
Figure 8:
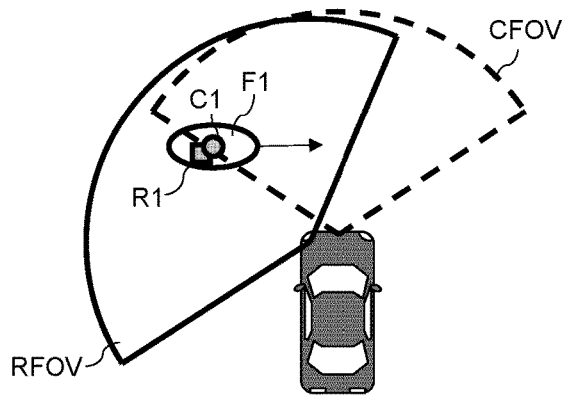
Figure 8:
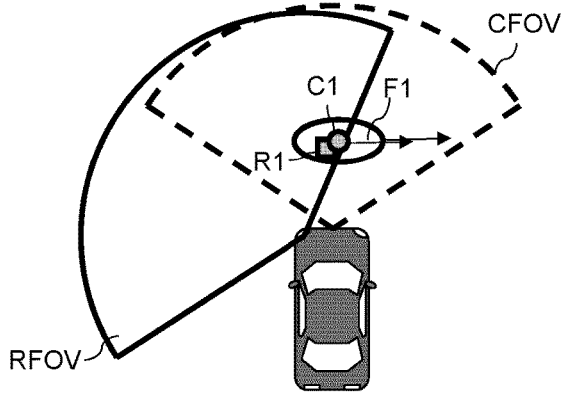
Figure 8:
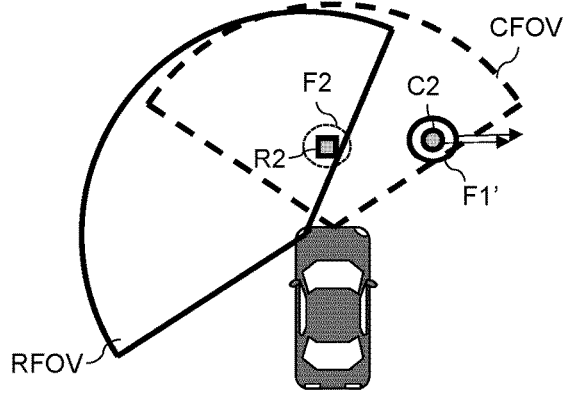

Next, a target detection device according to a second embodiment will be described with reference to FIGS. 7 and 8. FIG. 7 is a functional block diagram of the target detection device (sensor fusion device 1) according to the second embodiment. In FIG. 7, the same components as those of the first embodiment (FIG. 1) are denoted by the same reference signs, and an overlapping description is omitted below.

The sensor fusion device 1 of the second embodiment is different from the sensor fusion device 1 of the first embodiment in that an integration processing unit 30 includes a movement prediction unit 30d in addition to the same components as those of the sensor fusion device 1 of the first embodiment. The movement prediction unit 30d acquires movement prediction information such as a moving speed and a moving direction of a target according to detection information of a first sensor 10a and a second sensor 10b and detection information of an own vehicle behavior sensor 10c. According to these prediction results in the movement prediction unit 30d, a grouping unit 30a and an integration unit 30b of the integration processing unit 30 performs grouping and integration, respectively. The movement prediction information acquired by the movement prediction unit 30d includes, in addition to the moving speed and moving direction of the target, an acceleration, a continuous position deviation, an orientation (for example, an orientation of a face and a line of sight of a pedestrian) of the target obtained from image recognition, and the like, and is not limited to a specific combination.

Next, a procedure for reliability determination and detailed type information assignment in a reliability determination unit 50 and a detailed type assignment unit 60 according to the second embodiment will be described. The procedure itself is similar to that of the first embodiment (FIG. 2), but as described above, the movement prediction information is referred to in the grouping and integration processing in the integration processing unit 30.

The description will be given with reference to FIG. 8 based on a specific scenario. Here, as in FIG. 3, a case where a pedestrian 200 crosses in front of an own vehicle 210 will be described as an example. A substantially similar description applies to a case where the operations as in FIGS. 4 to 6 are performed.

The situation of FIG. 8(B) is similar to the situation of FIG. 3(B). The grouping unit 30a groups detection information of a pedestrian target C1 with a target ID=1 from the first sensor 10a and detection information of an unidentified target R1 with the target ID=1 from the second sensor 10b by assigning the target ID of 1 (target ID=1) based on matching of the movement prediction information in addition to position information of the detection information. The integration unit 30b integrates the grouped detection information to generate the fusion target F1.

The situation of FIG. 8(C) is similar to the situation of FIG. 3(C). By grouping using not only the position information of the target but also the movement prediction information, in FIG. 8(C), the detection information of the first sensor 10a can be integrated as the fusion target F1 with the target ID=1 in which the detection information for the pedestrian obtained by the first sensor 10a is grouped until the previous cycle (t=t1), also in the current cycle (t=t2).

After FIG. 8(C), when the pedestrian 200 further crosses the own vehicle 210 to the right and the integration processing unit 30 further shifts to the next cycle (t=t3), the situation shifts to the situation as in FIG. 8(D). In FIG. 8(D), the pedestrian 200 is still within a sensing range CFOV of the first sensor 10a, and has moved out of a sensing range RFOV of the second sensor 10b. However, detection information (target R2) indicating that the specific type=unidentified is obtained by an internal interpolation function of the second sensor 10b. Meanwhile, since the pedestrian 200 is within the sensing range CFOV of the first sensor 10a, the first sensor 10a senses the pedestrian 200, and detection information (target C2) indicating that the specific type=pedestrian is obtained.

Since the position information of the detection information of the second sensor 10b does not match the position information of the detection information of the first sensor 10a, the detection information (target C2) of the first sensor 10a is not grouped for the same target ID as the detection information (target R2) of the second sensor 10b. The target C2 is integrated as a fusion target F1', and the target R2 is integrated as another fusion target F2.

At this time, the grouping unit 30a and the integration unit 30b assign the same target ID=1 as that of the fusion target F1 of the previous cycle to the fusion target F1' in which the detection information (target C2) of the first sensor 10a is integrated, based on the matching degree of the movement prediction information with the previous cycle. Another target ID=2 is assigned to the fusion target F2. Detailed type information indicating that the specific type=pedestrian and the reliability="confirmed" is assigned to the fusion target F1' based on a target identification result in the first sensor 10a. For the fusion target F2, since only the detection information of the second sensor 10b is obtained, identification information indicating that the specific type=unidentified is assigned.

As described above, according to the second embodiment, it is possible to perform determination of the specific type of the fusion target with higher reliability by referring to the movement prediction information, in addition to obtaining the same effect as that of the first embodiment.

[Others]

The present invention is not limited to the above-described embodiments, but includes various modifications and equivalent configurations within the scope of the appended claims. For example, the above-described embodiments have been described in detail in order to explain the present invention in an easy-to-understand manner, and the present invention is not necessarily limited to those having all the configurations described. Further, a part of the configuration of one embodiment may be replaced with the configuration of another embodiment. In addition, the configuration of another embodiment may be added to the configuration of one embodiment. In addition, a part of the configuration of each embodiment may be added with another configuration, may be deleted, and may be replaced with another configuration.

Further, a part of, or the entirety of the respective configurations, functions, processing units, processing means, and the like described above may be implemented by hardware, for example, may be designed as an integrated circuit, or may be implemented by software for a processor interpreting and executing programs for implementing the respective functions. Information such as a program, a table, and a file for implementing each function can be stored in a storage device such as a memory, a hard disk, or a solid state drive (SSD), or a recording medium such as an IC card, an SD card, a DVD, or a BD.

In addition, the control lines and information lines illustrated in the accompanying drawings indicate those considered necessary for explanation, and do not necessarily indicate all the control lines and information lines necessary for implementation. In actual implementation, it may be considered that almost all configurations are interconnected.

REFERENCE SIGNS LIST 1 sensor fusion device
2 driving control device
10a first sensor
10b second sensor
10c own vehicle behavior sensor
20 observation information processing unit
30 integration processing unit
30a grouping unit 30b integration unit
30c prediction update unit
40 integration history management unit
50 reliability determination unit
200 pedestrian
210 own vehicle
220 manhole
230 preceding vehicle
240 obstacle

The invention claimed is:

1. A target detection device that detects a target around a vehicle based on sensor information measured by a plurality of sensors, the target detection device comprising:
a first sensor;
a second sensor; and
a processor configured to:
 integrate detection information of the target of the first sensor and detection information of the target of the second sensor for each cycle;
 manage an integration result as an integration history in time series; and
 determine reliability of a type of the target based on the integration history and the pieces of detection information of the target of the first sensor and the second sensor,
wherein determining reliability of the type of target further comprises:
 a first step of determining whether or not the detection information has been grouped as one fusion target and assigned with specific type information in a current cycle,
 a second step of determining whether or not the detection information has been grouped as the fusion target and assigned with the specific type information in a previous cycle, and
 a third step of determining whether or not another piece of detection information grouped in the previous cycle and related to the assigned specific type exists in the current cycle, and
wherein the detection information of the target of the first sensor includes type information of the target.

2. The target detection device according to claim 1, wherein the first sensor and the second sensor are configured to output position information of the target as the detection information, and the processor is configured to perform the integration according to the position information.

3. The target detection device according to claim 1, wherein the processor is further configured to manage a target ID and a target type of a fusion target in time series as the integration result.

4. A target detection device that detects a target around a vehicle based on sensor information measured by a plurality of sensors, the target detection device comprising:
a first sensor;
a second sensor; and
a processor configured to:
 integrate detection information of the target of the first sensor and detection information of the target of the second sensor for each cycle;
 manage an integration result of integration processing as an integration history in time series; and
 determine reliability of a type of the target based on the integration history and the pieces of detection information of the target of the first sensor and the second sensor,
wherein determining reliability of the type of target further comprises:
 a first step of determining whether or not the detection information has been grouped as one fusion target and assigned with specific type information in a current cycle,
 a second step of determining whether or not the detection information has been grouped as the fusion target and assigned with the specific type information in a previous cycle, and
 a third step of determining whether or not another piece of detection information grouped in the previous cycle and related to the assigned specific type exists in the current cycle,
wherein the detection information of the target of the first sensor includes type information of the target, and
wherein the processor is further configured to determine reliability of determination of the specific type information according to determination results of the first to third steps.

5. The target detection device according to claim 1, wherein the first sensor and the second sensor are configured to output position information of the target as the detection information, and
the processor is further configured to:
 predict movement of the target, and
 perform the integration according to the position information and the predicted movement of the target.

6. The target detection device according to claim 1, further comprising an own vehicle behavior sensor configured to sense a behavior of an own vehicle.

* * * * *